United States Patent [19]

Deck

[11] 4,034,622
[45] July 12, 1977

[54] INFINITELY ADJUSTABLE CABLE CONTROLLED APPARATUS AND METHOD

[75] Inventor: James R. Deck, Eureka, Ill.

[73] Assignee: Caterpillar Tractor Co., Peoria, Ill.

[21] Appl. No.: 697,300

[22] Filed: June 17, 1976

[51] Int. Cl.² .................................... F16C 1/16
[52] U.S. Cl. .............................. 74/501 R; 74/510; 251/285; 251/294
[58] Field of Search ............ 74/501 R, 501.5, 487, 74/489, 510, 525; 251/285, 294

[56] References Cited

U.S. PATENT DOCUMENTS

| 2,109,870 | 3/1938 | Thwaits | 251/294 |
| 3,101,821 | 8/1963 | Henry | 74/501 X |
| 3,744,339 | 7/1973 | Martinson | 74/501 R |

Primary Examiner—Clarence R. Gordon
Attorney, Agent, or Firm—Phillips, Moore, Weissenberger, Lempio & Majestic

[57] ABSTRACT

A cable controlled apparatus comprises a housing having a control member movably mounted therein and adapted to actuate a directional control valve or the like. The cable is threadably mounted in a bracket, mounted on the housing, to selectively move and adjust the position of the valve control member upon rotation of the bracket. A clamping member is mounted on the housing and has an annular groove defined thereon for retaining a flanged base of the bracket therein whereby axial movement of the bracket is prevented upon rotation thereof.

13 Claims, 3 Drawing Figures

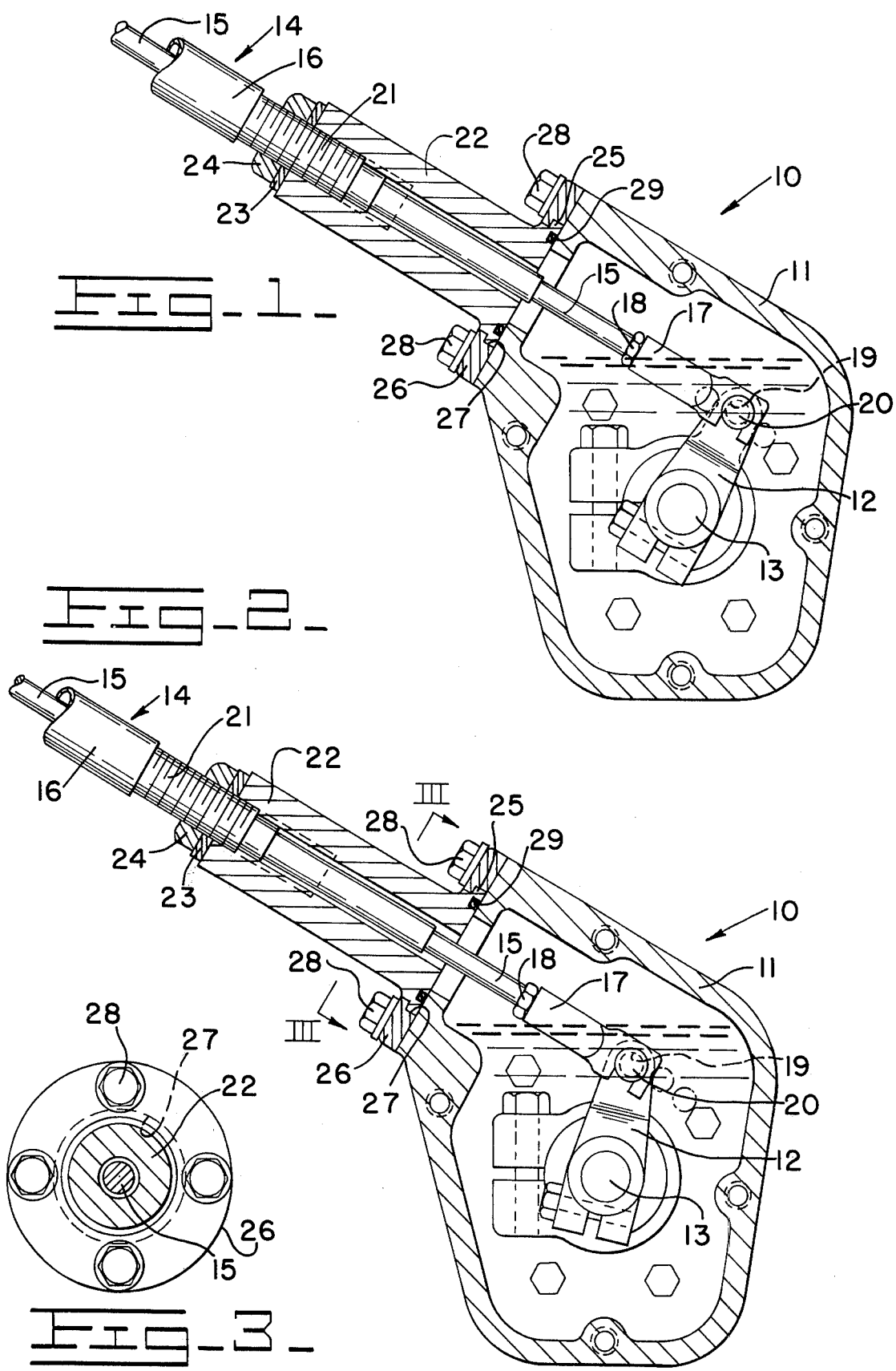

INFINITELY ADJUSTABLE CABLE CONTROLLED APPARATUS AND METHOD

CROSS REFERENCE TO RELATED APPLICATION

This application generally relates to the type of cable-controlled apparatus disclosed in U.S. Pat. application Ser. No. 675,025, filed on Apr. 8, 1976 by Michael E. Moore et al for "Cable Mounting and Adjustment Means and Method for Assembling the Same".

BACKGROUND OF THE INVENTION

Cable controls are employed for selectively actuating control linkages used in transmissions, steering clutch and brake controls and like devices employed on earthworking vehicles. For example, the cable control may be employed to actuate a valve spool employed in the hydraulic control for a transmission and is normally connected to the valve spool by linkage means, including interconnected bellcranks and levers. Such a valve spool must be closely calibrated and adjusted upon assembly of the transmission control and may require periodic readjustment thereafter.

One problem with conventional cable controls is that they necessarily require substantial demantling thereof to precisely adjust or readjust the valve spool. Such a laborious procedure unduly increases service time as well as down-time of a particular vehicle. In addition, detachment of the cable mounting apparatus from a housing, retaining the control valve and actuating linkages therefor, necessarily exposes the same to contaminants and permits the escape of fluid from those types of transmission controls which require continuous exposure to clean lubricant.

SUMMARY OF THIS INVENTION

This invention overcomes the above, briefly described problems by providing an economical and noncomplex method and cable-controlled apparatus which is infinitely adjustable externally of a housing thereof. the housing has a control member movably mounted therein and a flexible push-pull cable means is connected to the control member for selectively moving it. A bracket, mounted on the housing by a retaining means, has a cable means mounted thereon and adjustment means are provided for adjustably mounting the cable means for axial movement on the bracket.

Thus, adjustment of the cable means will selectively move and adjust the position of the control member relative to the housing upon rotation of the bracket. The retaining means preferably comprises a releasable clamping member mounting a flange of the bracket on the housing to permit selective rotation thereof upon adjustment of the control member. The clamping member prevents axial movement of the bracket during such adjustment.

BRIEF DESCRIPTION OF THE DRAWING

FIG. 1 is a sectional view of an infinitely adjustable cable-controlled apparatus embodying this invention with a control member thereof shown in one adjusted position of operation;

FIG. 2 is a view similar to FIG. 1, but showing the control member in a second adjusted position of operation; and FIG. 3 is a sectional view taken in the direction of arrows III—III in FIG. 2.

DETAILED DESCRIPTION

FIG. 1 discloses an infinitely adjustable cablecontrolled apparatus 10 comprising a housing or support member 11 having a control member 12 movably mounted therein. The control member may comprise a lever suitably secured on a rock shaft 13 which is, in turn, suitably connected to a valve spool (not shown) employed in a directional control valve for transmission or the like. Pivotal movements of the lever and rock shaft are effected by a flexible push-pull cable means 14 having a flexible cable 15 reciprocally mounted in a tubular sheath 16 in a conventional manner.

One end of the cable may be suitably connected to actuating means (not shown) mounted in an operator's cab of a vehicle for selectively reciprocating the cable in the sheath. The second end of the cable has a member 17 threadably mounted thereon and locked in place on the cable by a lock nut 18. The member has a U-shaped slot 19 formed on the end thereof to engage a pin 20 secured on lever 12. Sheath 16 of the cable means has a threaded coupling member 21 secured thereto and threadably mounted on a first or outer end of a bracket 22 at interengaging screw threads.

A lock washer 23 and a lock nut 24, threadably mounted on coupling member 21, secure cable means 14 in a fixed axial position relative to the bracket and housing 11. The second or inner end of the bracket has an annular flange 25 formed thereon. The flange is clamped in place by an annular retaining means or clamping member 26 having an annular groove 27 defined circumferentially therein to accommodate flange 25. A plurality of cap screws 28 (FIG. 3) releasably attach member 26 to housing 11 and an O-ring seal 29 is mounted in a recess defined on bracket 22 to sealingly engage the housing.

When it is desired to adjust control member 12 from its FIG. 1 position to the position illustrated in FIG. 2, lock nut 24 is backed-off on coupling member 21 and cap screws 28 are each backed-off approximately one turn. The clamping force imparted to flange 25 of bracket 22 by member 26 is thus released to permit the bracket to be rotated whereby the interengaging screw threads between the coupling member and the bracket will move cable means 14 leftwardly to its FIG. 2 position. Thus, cable 15 will also move axially (due to its frictional "capture" within sheath 16) to pivot control member 12 counterclockwise about the axis of rock shaft 13. Upon final adjustment, lock nut 24 and cap screws 28 are retightened to retain control member 12 in its adjusted position.

In addition to the infinitely variable adjustment of the cable, housing 11 provides for full enclosure and protection of control lever 12 and attendant linkages. The fact that the adjustments of control lever 12 can be made externally of the housing substantially reduces the service time and "down-time" of the vehicle required to effect the same. Also, since bracket 22 and seal 29 are maintained in close contact with the housing during such adjustment, the ingress of contaminants into the housing is substantially prevented. The latter desideratum is particularly useful with transmission controls wherein housing 11 would be at least partially filled with a lubricating fluid. The control linkages are also fully protected during operation of the vehicle against accidental movement, such as being struck by an object during movement of the vehicle.

What is claimed is;

1. An infinitely adjustable cable-controlled apparatus comprising
   a support member,
   a control member movably mounted on said support member,
   push-pull cable means connected to said control member for selectively moving the same,
   a bracket mounted on said support member and mounting said cable means thereon,
   adjustment means adjustably mounting said cable means on said bracket for axial movement thereon to selectively move and adjust the position of said control member relative to said support member upon rotation of said bracket, and
   retaining means mounting said bracket on said support member and for selectively permitting rotation of said bracket relative to said support member upon adjustment of said control member.

2. The apparatus of claim 1 wherein said adjustment means comprises interengaging screw threads threadably mounting said cable means on said bracket.

3. The apparatus of claim 2 wherein said cable means comprises of flexible cable reciprocally mounted in a sheath, an end of said cable connected to said control member and said sheath having a coupling member secured thereon and threadably attached to said bracket by said interengaging screw threads.

4. The apparatus of claim 1 wherein said bracket is tubular and has a flange formed on a lower end thereof and disposed in abutting relationship on said support member.

5. The apparatus of claim 4 wherein said retaining means comprises a clamping member defining an annular recess accommodating the flange of said bracket therein and releasable fastening means releasably attaching said flange member to said support member.

6. The apparatus of claim 1 wherein said adjustment means comprises a coupling member secured on said cable means and threadably attached to said bracket by interengaging screw threads.

7. The apparatus of claim 6 further comprising a lock nut threadably mounted on said coupling member for locking said coupling member in a predetermined axial position relative to said bracket.

8. The apparatus of claim 1 further comprising annular sealing means disposed in an annular recess defined on a lower end of said bracket and abutting said support member in sealing contact therewith.

9. The apparatus of claim 1 wherein an end of said cable means connected to said control member has a U-shaped slot formed therein and wherein said control member has a pin secured thereon, said pin disposed on said slot.

10. The apparatus of claim 1 wherein said control member constitutes a lever secured on a rock shaft.

11. The apparatus of claim 1 wherein said support member constitutes a housing having said control member disposed internally therein and wherein said bracket and said retaining means are each mounted externally on said housing.

12. A method for adjusting a cable-controlled apparatuss comprising a housing, a control member movably mounted in said housing, a flexible push-pull cable means having a cable reciprocally mounted in a sheath thereof, a bracket detachably mounted on said housing and having said cable adjustably mounted for axial movement therein and a clamping member releasably clamping said bracket to said housing, comprising the steps of
   releasing said clamping member from said housing,
   rotating said bracket and simultaneously moving said cable means axially and also moving said control member and
   reclamping said clamping member to said housing to secure said bracket against rotation relative to said housing.

13. The method of claim 11 further comprising the step of locking said cable means against axial movement relative to said bracket.